US012752918B2

(12) United States Patent
Hamelin et al.

(10) Patent No.: US 12,752,918 B2
(45) Date of Patent: Oct. 6, 2026

(54) CONVEYING AND RELEASE DEVICE WITH CARTRIDGE PRESENCE INDICATOR

(71) Applicant: ARESIA-Valenton, Valenton (FR)

(72) Inventors: Arnaud Hamelin, Valenton (FR); Victor Blondel, Valenton (FR)

(73) Assignee: ARESIA-VALENTON, Valenton (FR)

( * ) Notice: Subject to any disclaimer, the term of this patent is extended or adjusted under 35 U.S.C. 154(b) by 797 days.

(21) Appl. No.: 18/025,445

(22) PCT Filed: Sep. 16, 2021

(86) PCT No.: PCT/FR2021/051586
§ 371 (c)(1),
(2) Date: Mar. 9, 2023

(87) PCT Pub. No.: WO2022/058687
PCT Pub. Date: Mar. 24, 2022

(65) Prior Publication Data

US 2023/0322384 A1 Oct. 12, 2023

(30) Foreign Application Priority Data

Sep. 17, 2020 (FR) ....................................... 2009411

(51) Int. Cl.
*B64D 7/08* (2006.01)
*B64D 1/06* (2006.01)
*B64F 5/60* (2017.01)

(52) U.S. Cl.
CPC ................. *B64D 7/08* (2013.01); *B64D 1/06* (2013.01); *B64F 5/60* (2017.01)

(58) Field of Classification Search
CPC ................ B64F 5/60; B64D 7/08; B64D 1/06
See application file for complete search history.

(56) References Cited

U.S. PATENT DOCUMENTS 5,088,664 A * 2/1992 Ellis ........................ B64D 1/06
294/82.26
6,347,768 B1 * 2/2002 Jakubowski, Jr. ....... B64D 1/04
91/468

* cited by examiner

*Primary Examiner* — Gilbert Y Lee
(74) *Attorney, Agent, or Firm* — Volpe Koenig

(57) ABSTRACT

An aeronautical conveying and release device, actuated by a cartridge, includes a housing provided in a body having a recess having an open end and a bottom, a cartridge adapter configured to close the recess and forming a chamber capable of housing the cartridge, an indicator movably mounted between first and second positions. The cartridge adapter includes a bolt configured to be screwed into the housing so that in the presence of the cartridge, the bolt can be screwed to a first depth where the bolt abuts against the cartridge, the cartridge being in abutment against the bottom of the recess, and in the absence of a cartridge, the bolt can be screwed to a second depth, greater than the first, and the bolt at the first depth prohibits the first position for the indicator, while the bolt at the second depth leaves the indicator free to move.

11 Claims, 6 Drawing Sheets

CONVEYING AND RELEASE DEVICE WITH CARTRIDGE PRESENCE INDICATOR

FIELD OF THE INVENTION

The invention relates to the field of aeronautical conveying and release devices, in particular ejectors, and in particular pyrotechnic. Ejectors are conveying and release devices for an aircraft that can alternatingly retain and free on command a projectile, also called load. Ejectors are intended to be mounted on fixed- or rotary-wing aircraft, typically armed airplanes, helicopters or drones.

BACKGROUND

An ejector is typically installed in the lower part of an aircraft, for example under a fuselage or under a wing. The ejector receives a projectile that it retains in flight. The ejector further houses two pyrotechnic cartridges housed in a chamber. Upon reception of a separation command, the ejector activates, or fires, the pyrotechnic cartridge. The ejector thus frees the projectile, then pushes the projectile away from the aircraft, in general vertically.

The cartridge must be changed after a mission. After a flight, an operator on the ground verifies the presence of an unfired cartridge for each chamber. To do this, the operator must follow a strict procedure relative to the handling of a pyrotechnic projectile of type I, then opens the chamber of the ejector to verify the state of the cartridge. If the cartridge is unfired, the operator removes the cartridge and deposits the cartridge in a container dedicated to the storage of non-activated cartridges. Given the risk of rapid combustion, the verification of the state of a cartridge must be carried out before any other maintenance operation on the ejector. This prevents other operators from approaching a security zone around the ejector and its load as long as the state of a cartridge has not been verified. The verification is dangerous for the operator, even well protected. There is a need to secure the personnel on the ground.

The invention improves the situation.

SUMMARY

The invention aims to reduce the risks run by humans in the preparation of and the return from a mission.

For these purposes, the invention proposes an aeronautical conveying and release device actuated by a pyrotechnic cartridge, said device comprising at least:

a. a housing provided in a body comprising a recess, the recess having an open end and a bottom, and b. a cartridge adapter capable of closing the recess and forming a chamber capable of housing the cartridge, characterized in that:

a. the device comprises an indicator mounted, on an outer face of the body, movably between a first position and a second position, b. the cartridge adapter comprises a bolt capable of being screwed into the housing so that in the presence of a pyrotechnic cartridge, the bolt can be screwed to a first depth where the bolt abuts against the pyrotechnic cartridge, the pyrotechnic cartridge being in abutment against the bottom of the recess, and in the absence of a pyrotechnic cartridge, the bolt can be screwed to a second depth greater than the first depth, and a. the bolt at the first depth prohibits the first position for the indicator, while the bolt at the second depth leaves the indicator free to move.

The invention allows to verify, in the closed chamber equipped with its cartridge adapters state, the presence of a cartridge. To do this, an operator on the ground raises while maintaining the cartridge presence indicator and screws until contact the cartridge adapter with the bottom of the chamber sealing the latter. Then, the operator can release the cartridge presence indicator. If the indicator arrives up to the first position, then there is no cartridge in the chamber, and the operator can open the chamber. On the contrary, if the indicator is blocked before arriving at the first position, this means that the cartridge is present in the chamber. The cartridge should then be removed while taking the necessary precautions.

The verification is rapid. Since the chamber remains closed during the verification, the security for the operator is greatly reinforced. This avoids the operator having to follow constraining procedures as well as wear suitable pyrotechnic protective equipment. The operator is protected against possible burns in the case of accidental combustion of the cartridge since the cartridge is confined in the chamber. The verification of the presence of the cartridge is faster. The tasks on the ground can thus be carried out in parallel. This leads to a reduction in the time of immobilization of the aircraft on the ground between two missions. Last verifications before a mission can further be carried out since the verification of the presence of a cartridge is fast and does not require constraining materials. This is particularly advantageous by increasing the availability of the aircraft.

The device can have one or more of the following aspects.

In one embodiment, the cartridge adapter forms a stop for a rim of the pyrotechnic cartridge when the bolt is screwed to the first depth in the presence of the pyrotechnic cartridge. The cartridge is held in place.

In one embodiment, the chamber has two opposite ends, one formed by a bottom, the other formed by the bolt, an end of the pyrotechnic cartridge abutting against the bottom when the pyrotechnic cartridge is housed in the chamber, the bolt abutting against the opposite end of the cartridge when the bolt is screwed to the first depth.

In one embodiment, in the absence of a cartridge, the bolt can be screwed in abutment against a bottom part of the cartridge adapter. The bolt can be screwed to a depth greater than during the presence of a cartridge.

In one embodiment, the indicator comprises a paddle rotatably mounted in the body near the open end of the recess. The paddle is visible to an operator.

In one embodiment, the paddle has a flat overall shape and is mounted in a recess provided in an outer face of the device, in particular set back or flush.

In one embodiment, the bolt comprises a central case comprising a first skirt and a head part, and a plug. The bolt partly surrounds the cartridge.

In one embodiment, the cartridge adapter comprises a bottom part comprising a radial part and a second skirt capable of being coupled with the first skirt, to form the chamber, the plug being capable of being coupled with the head part, the cartridge adapter being capable of being separated from the body while preserving the pyrotechnic cartridge.

In one embodiment, the device comprises an ejection portion, capable of pushing a projectile received by the device when a cartridge housed in the cartridge adapter is activated.

In one embodiment, the bottom of the recess or of the cartridge adapter comprises at least one orifice connecting the cartridge adapter to the ejection portion.

In one embodiment, the device comprises a firing indicator informing on a fired state or a non-fired state of the device. The operator visually notes the fired or non-fired state.

In one embodiment, a method for verifying a device seen above comprises at least the following group of steps:

1a) raising the cartridge presence indicator, 1b) screwing the cartridge adapter into the housing until abutment, 1c) releasing the cartridge presence indicator, and 1d) determining whether the cartridge presence indicator reaches the first position.

In one embodiment, a method for verifying a device seen above comprises the following group of steps:

2a) moving the cartridge presence indicator into a third position, 2b) removing the cartridge adapter, Yes)

opening the cartridge adapter, 2d) inserting a cartridge into the chamber, then closing the cartridge adapter, 2e) moving the cartridge presence indicator, then remounting the cartridge adapter provided with the cartridge in the housing, 2f) releasing the cartridge presence indicator.

In one embodiment, a method for verifying a device seen above comprises the following group of steps:

3a) if the cartridge presence indicator is in the first position, removing the cartridge adapter, and ending the verification, 3b) if the indicator is at a distance from the first position, in particular in the second position, verifying the state of the firing indicator, then:

3c) if the firing indicator is in the fired state, then removing the cartridge adapter, opening the chamber to remove the cartridge, otherwise carrying out a procedure of removal of a non-fired cartridge, and ending the verification.

BRIEF DESCRIPTION OF THE DRAWINGS

Other features and advantages of the invention will be disclosed in detail in the following description, made in reference to the appended drawings, in which.

DETAILED DESCRIPTION OF THE PREFERRED EMBODIMENTS

The appended drawings contain, in essence, elements of a certain nature. They can thus not only be used to make the present invention better understood, but also contribute to its definition, if necessary.

Figure 1:
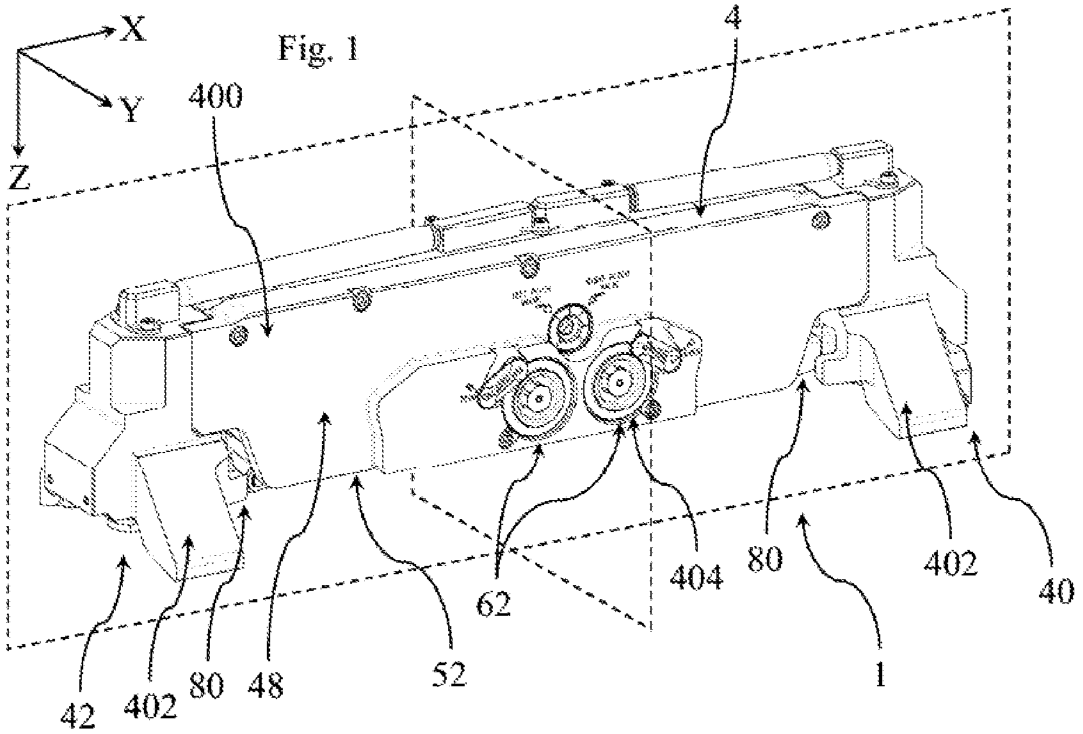
FIG. 1 is a perspective view of an ejector according to one aspect of the invention, cartridge in place.
Figure 2:
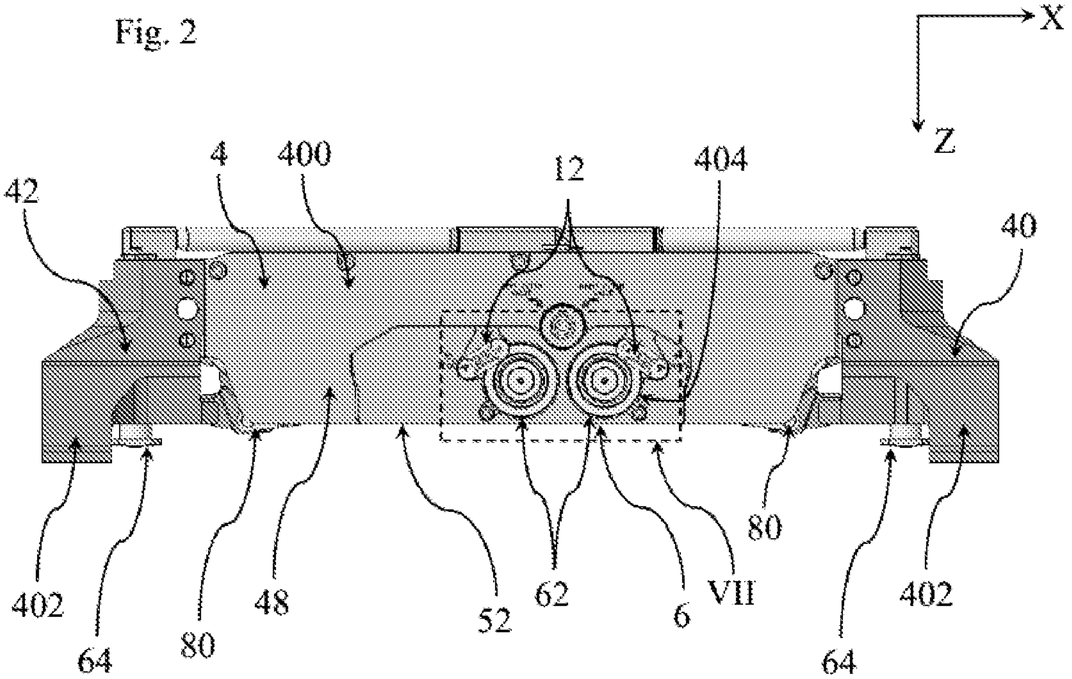
FIG. 2 is a right elevation view of the ejector of FIG. 1.
Figure 3:
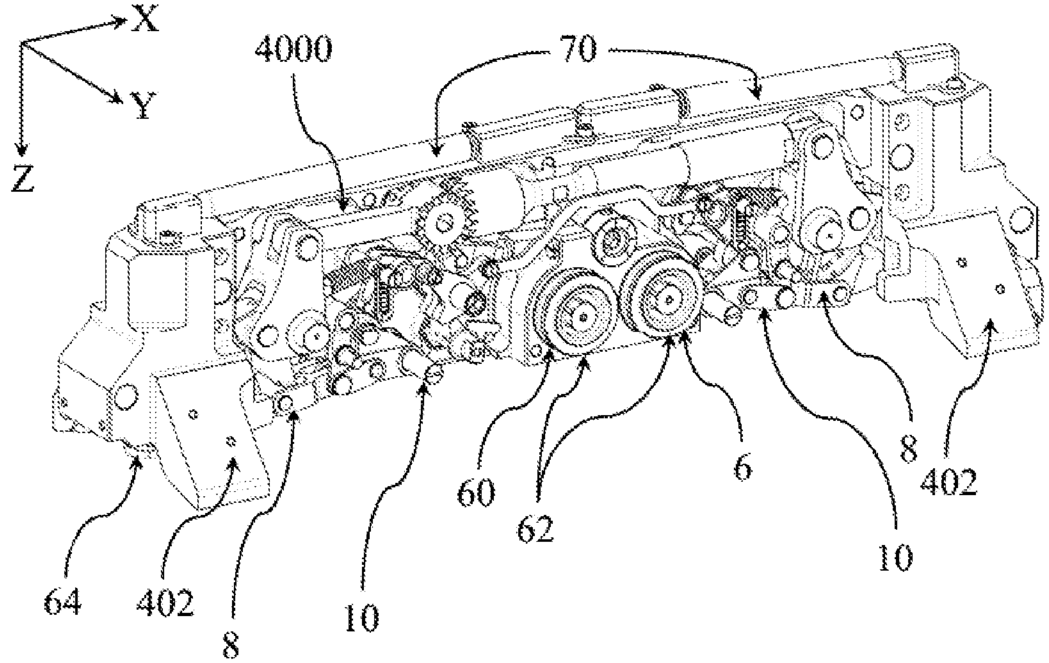
FIG. 3 is a perspective view of the inside of the ejector of FIG. 1.

FIGS. 1 to 3 show an ejector 1 according to one aspect of the invention.

The ejector 1 is intended to be fastened to an aircraft, for example a fighter plane, and to receive a projectile (not shown) to be freed, also called load. The ejector 1 receives the projectile during a loading (on the ground) and is separated from said projectile, either during a release or an ejection in flight, or upon return from a mission for a replacement of the load.

The projectile includes on one of its walls a pair of retaining protrusions, for example in the shape of a ring or a T. The ejector 1 is coupled with said retaining protrusions upon loading of the ejector 1. The ejector 1 thus retains the projectile. Upon release, the ejector 1 frees the retaining protrusions of the projectile, then pushes the projectile in a thrust direction Z. The projectile is ejected. The energy of ejection is provided by at least one pyrotechnic cartridge 2 installed in the ejector 1 in a replaceable manner.

The ejector 1 extends along a direction X perpendicular to the thrust direction Z, from a front end portion 40 to a rear end portion 42. The ejector 1 is generally symmetrical with respect to a first plane (Y, Z) orthogonal to the direction X in the sense that the retaining protrusions are retained in the front end portion 40 and in the rear end portion 42.

In the embodiment described here, the ejector 1 has an appearance elongated along the direction X. Here, the ejector 1 is generally symmetrical with respect to a second plane (X, Z) parallel to the directions X and Z.

The ejector 1 has a parallel first lateral face and second lateral face 48, opposite according to a direction Y orthogonal to the plane (X, Z). In the drawings, the direction Z is oriented downwards. Here, the ejector 1 has a generally flat appearance with respect to the direction Y.

The ejector 1 has a lower face 52, perpendicular to the direction Z. The projectile received by the ejector 1 is facing the lower face 52. The retaining protrusions of the projectile are spaced apart according to the direction X.

The ejector 1 comprises a frame 4. The frame 4 comprises two spars 400, also called cases. The spars 400 are parallel and disposed at a distance from one another according to the direction Y. A first of the two spars 400 forms the first lateral face. The second of the two spars 400 forms the second lateral face 48.

The frame 4 comprises a plurality of lugs 402, here four in number. The lugs 402 are arranged in the lower part of the frame 4, on the lower face 52 side. Here, a first pair of lugs 402 is arranged near the front end 40 and another pair of lugs 402 is arranged near the rear end 42.

The lugs 402 are intended to abut against the projectile, when the projectile 2 is received by the ejector 1. The lugs 402 improve the stability of the projectile by providing supports distant from each other.

The spars 400 define between them the inside of the frame 4. The ejector 1 comprises, received inside the frame 4, a pyrotechnic assembly 6, a hook assembly 8 and a locking assembly 10, visible in particular in FIG. 3.

The pyrotechnic assembly 6 comprises a body 60, at least one cartridge adapter 62, a pair of ejection pistons 64 and an unlocking piston 66.

The body 60 is disposed towards the center of the ejector 1. In the body 60 at least one housing is provided, in particular by machining. In each of said at least one housing one of said cartridge adapters 62 is installed. Each cartridge adapter 62 is capable of storing a pyrotechnic cartridge 2. Each cartridge adapter 62 can alternatingly be open and closed. In the embodiment described here, two housings are provided in the body for two cartridge adapters 62. The cartridge adapters 62 are arranged in parallel according to the direction Y and juxtaposed.

Each cartridge adapter 62 typically has an overall shape of revolution about an axis according to the direction Y. The inside of each cartridge adapter 62 is accessible from the outside when the cartridge adapter 62 is open, so as to be able to insert therein and remove therefrom a pyrotechnic cartridge 2. Here, the access to the housings of the cartridge adapters 62 occurs from the right side of the frame 4, through an opening 404 opening onto the first lateral face. The opening 404 is formed in the right spar 400.

The ejection pistons 64 are disposed at the front and at the rear of the frame 4. The ejection pistons 64 protrude from the lower face 52, on either side of the housings according to the direction X. Here, the ejection pistons 64 are disposed near the end portions 42 and 44 of the lugs 402, see FIG. 2.

Each ejection piston 64 is fluidly connected to the cartridge adapters 62. Each pyrotechnic cartridge 2, once ignited, releases a pressurized gas. Then the pressurized gas flows out of each cartridge adapter 62 towards the ejection pistons 64. Then the ejection pistons 64 are deployed from the frame 4 downwards, by means of which the ejection pistons 64 eject the projectile.

The hook assembly 8 is arranged to alternatingly retain and free the projectile. The hook assembly 8 has a first state in which the hook assembly 8 is closed and retains the projectile. The hook assembly 8 has a second state in which the hook assembly 8 is open and frees the projectile. The hook assembly 8 is mobile between its two states.

The hook assembly 8 comprises a hook 80 arranged near the front end portion 40 and another hook 80 arranged near the rear end portion 42. Each of the hooks 80 is designed to couple with one of the retaining protrusions of the projectile.

When the hook assembly 8 is in its first state, each hook 80 is in a closed position in which the hook 80 retains the respective retaining protrusion of the projectile. The hooks 80 are locked. When the hook assembly 8 is in its second state, each hook 80 is in an open position in which the hook 80 frees or can receive the respective retaining protrusion of the projectile. The hooks 80 are unlocked.

The locking assembly 10 is arranged to lock and unlock the hooks 80 of the hook assembly 8. The locking assembly 10 is arranged between the body 60 and the hooks 80. The locking assembly 10 is arranged on either side of the body 60 along the direction X. The locking assembly 10 can be actuated by the unlocking piston 66, by means of which the locking assembly 10 unlocks the hooks 80.

The ejector 1 comprises near each cartridge adapter 62 a respective visual indicator 12 of presence of a pyrotechnic cartridge 2. The indicator 12 is disposed, at least partly, on one of the spars 400, here the spar 400 to the right of the ejector 1. The indicator 12 is visible and accessible at least partly from the outside of the frame 4.

Figure 4:
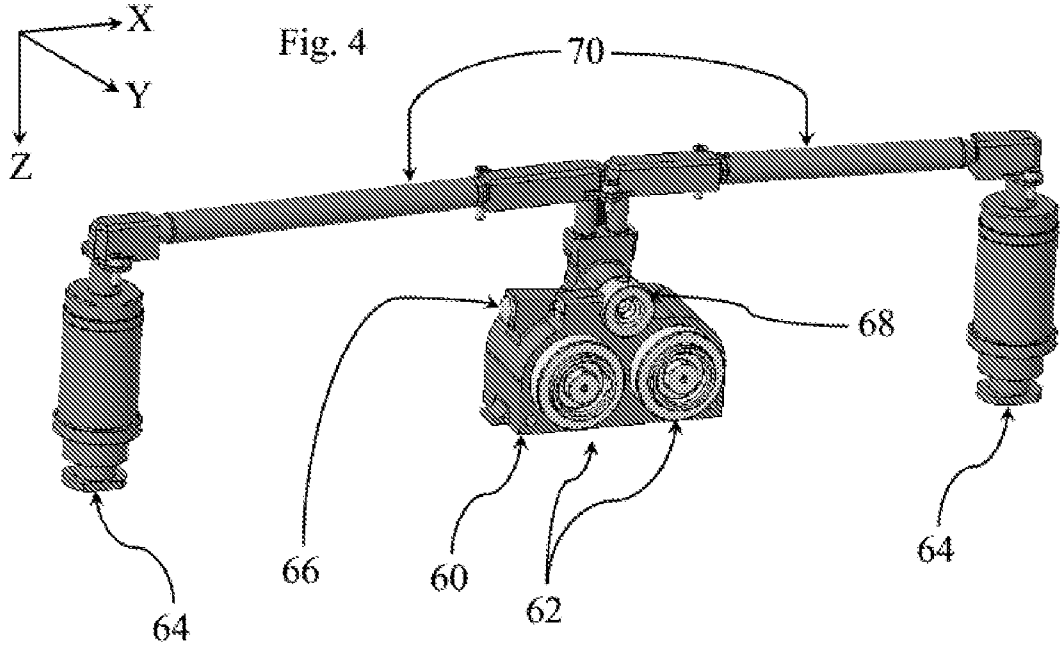
FIG. 4 is a view of the pyrotechnic assembly of the ejector of FIG. 3.
Figure 5:
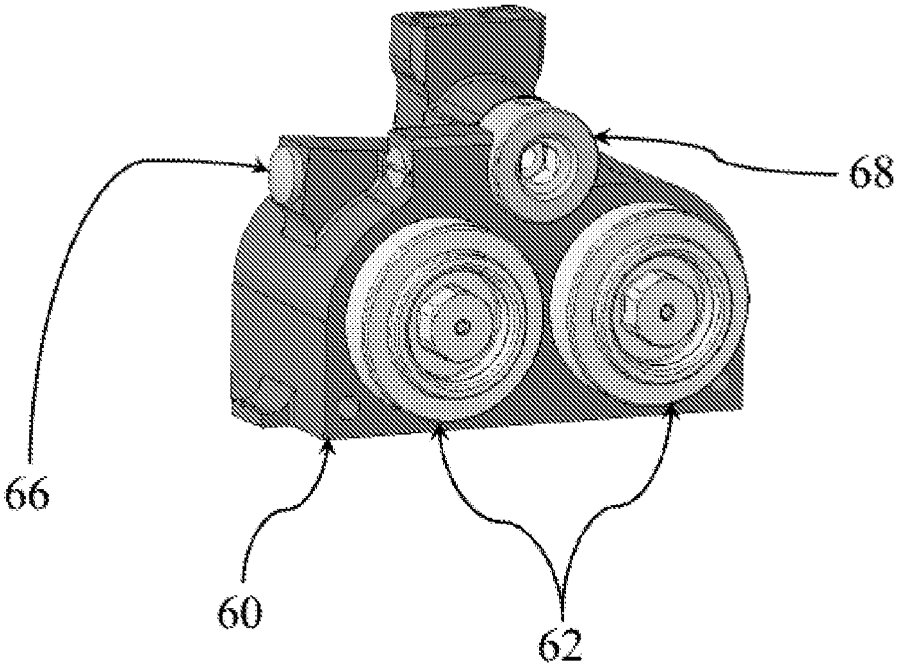
FIG. 5 is a view of the pyrotechnic chamber of the pyrotechnic assembly of FIG. 4.
Figure 6:
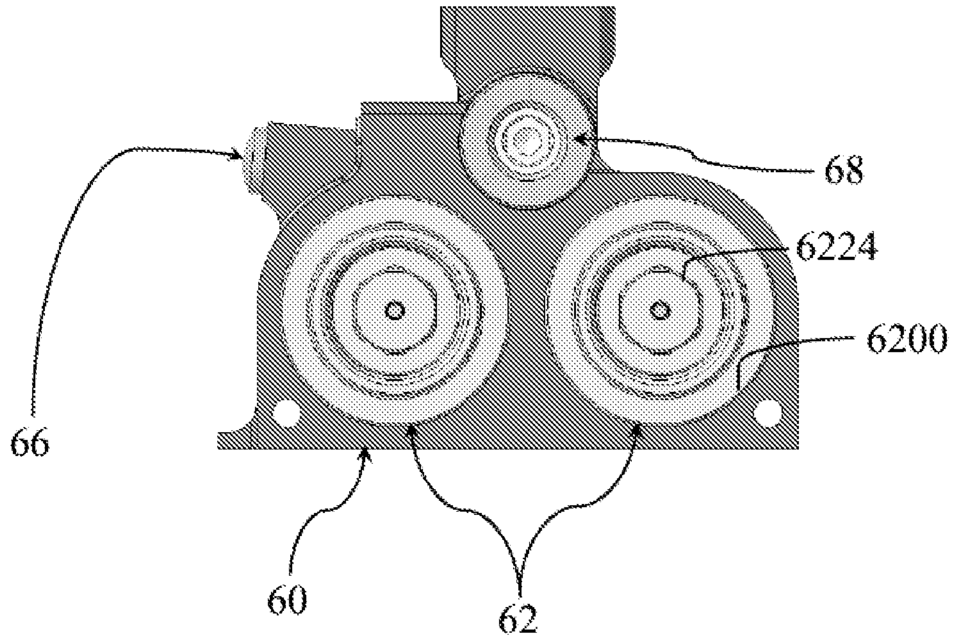
FIG. 6 is a front view of the pyrotechnic chamber of FIG. 5.

FIG. 4 shows the pyrotechnic assembly 6 and FIGS. 5 and 6 show the equipped body 60.

The pyrotechnic assembly 6 comprises a valve 68 and, for each ejection piston 64, a respective pipe 70 elongated longitudinally according to the axis X. The valve 68 is cylindrical here and arranged parallel to the housings of the cartridge adapters 62. The valve 68 is arranged in fluid communication with the housings. The valve 68 distributes the pressurized gas coming from the cartridge adapters 62 after an ignition of said cartridges 2 between the two pipes 70. Each pipe 70 fluidly connects the respective ejection piston 64 to the valve 68. The pressurized gas coming from the cartridges 2 flows through the cartridge adapters 62 towards the valve 68, then in the pipes 70 towards the ejection pistons 64.

The pyrotechnic assembly 6 comprises an ignition pin 72 for each cartridge adapter 2. Each ignition pin 72 is arranged to activate a pyrotechnic cartridge 2 housed in the respective cartridge adapter 62.

The unlocking piston 66 is arranged in the body 60. The unlocking piston 66 is in fluid communication with the housings. The unlocking piston 66 is disposed near the housings. Here, the unlocking piston 66 is arranged according to an axis perpendicular to the axes of the housings. The unlocking piston 66 is translatably mounted in a cylinder provided in the body 60 above one of the housings. The unlocking piston 66 is located between said housing and one of the pipes 70. The unlocking piston 66 is perpendicular to the axis of the valve 68. The unlocking piston 66 is next to the valve 68.

The unlocking piston 66 forms an actuator for freeing the projectile. When at least one of the pyrotechnic cartridges 2 is ignited, the pressurized gas coming from the pyrotechnic cartridge 2 flows directly towards the unlocking piston 66. The pressurized gas pushes the unlocking piston 66 to protrude from the body 60. The unlocking piston 66 drives the locking assembly 10, which in turn drives the hook assembly 8. The hook assembly 8 frees the projectile.

The ejection pistons 64 are disposed so that pressurized gas coming from the valve 68 reaches each ejection piston 64 substantially at the same time. The unlocking piston 66 is disposed fluidly closer to the pyrotechnic cartridge 2 than the ejection pistons 64, so that pressurized gas actuates the unlocking piston 66 before actuating the ejection pistons 64. Upon release, the unlocking piston 66 housed in the cylinder is provided to actuate the freeing of the projectile before the ejection pistons 64 push said projectile.

This allows to avoid pushing the projectile before its freeing. A useless stress on the hook assembly 8 is avoided. A loss of thrust energy is also avoided. The release is more efficient and reduces the risk of damaging the hook assembly 8. Moreover, since the source of pressurized gas actuating the unlocking piston 66 and the ejection pistons 64 is shared, the pyrotechnic assembly 6 is reliable and has a simple structure. The delay of the release cycle is reliable.

Figure 7:
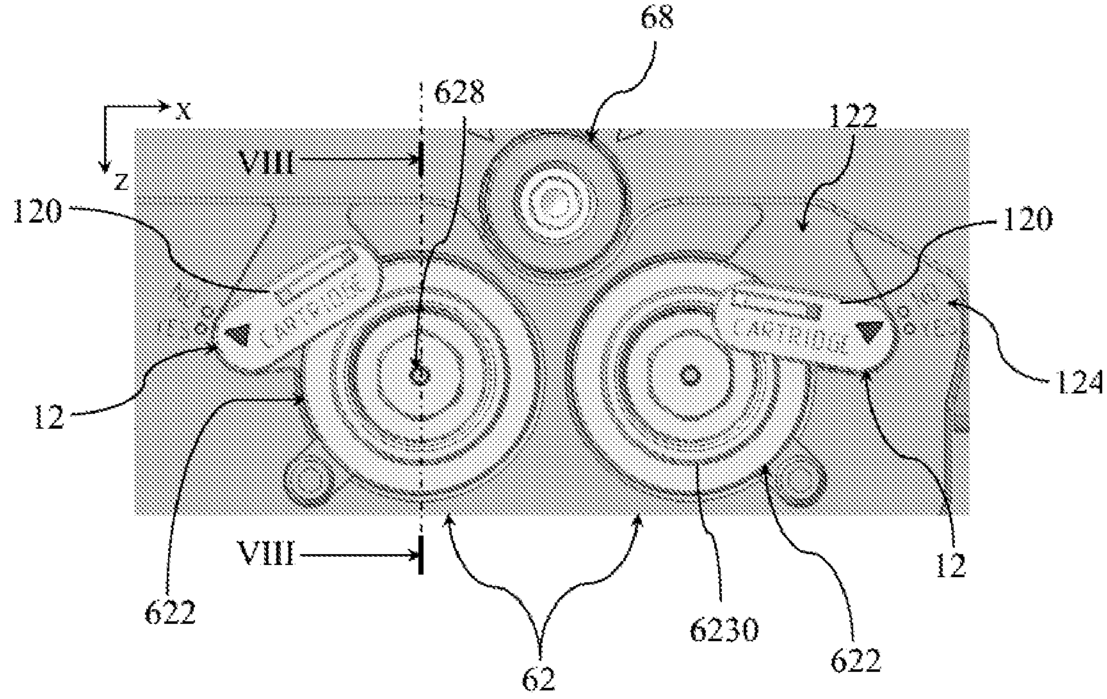
FIG. 7 is a view of the detail VII of FIG. 2.
Figure 8:
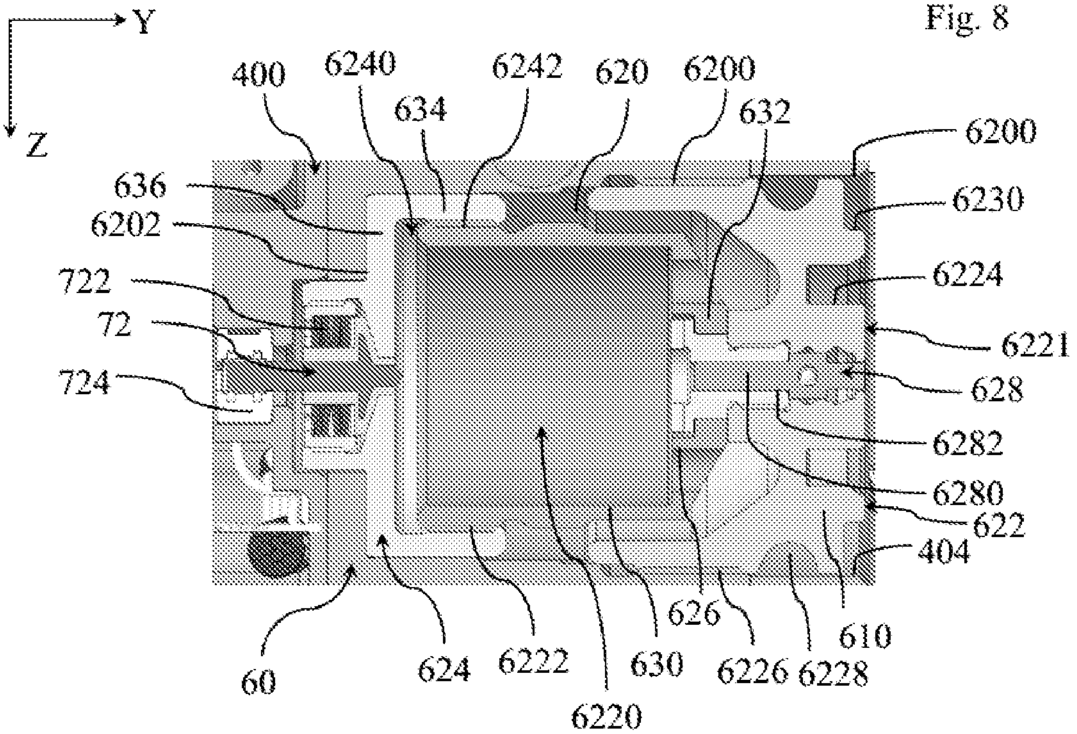
FIG. 8 is a view of the ejector of FIG. 7 according to the cross-section VIII-VIII.
Figure 9:
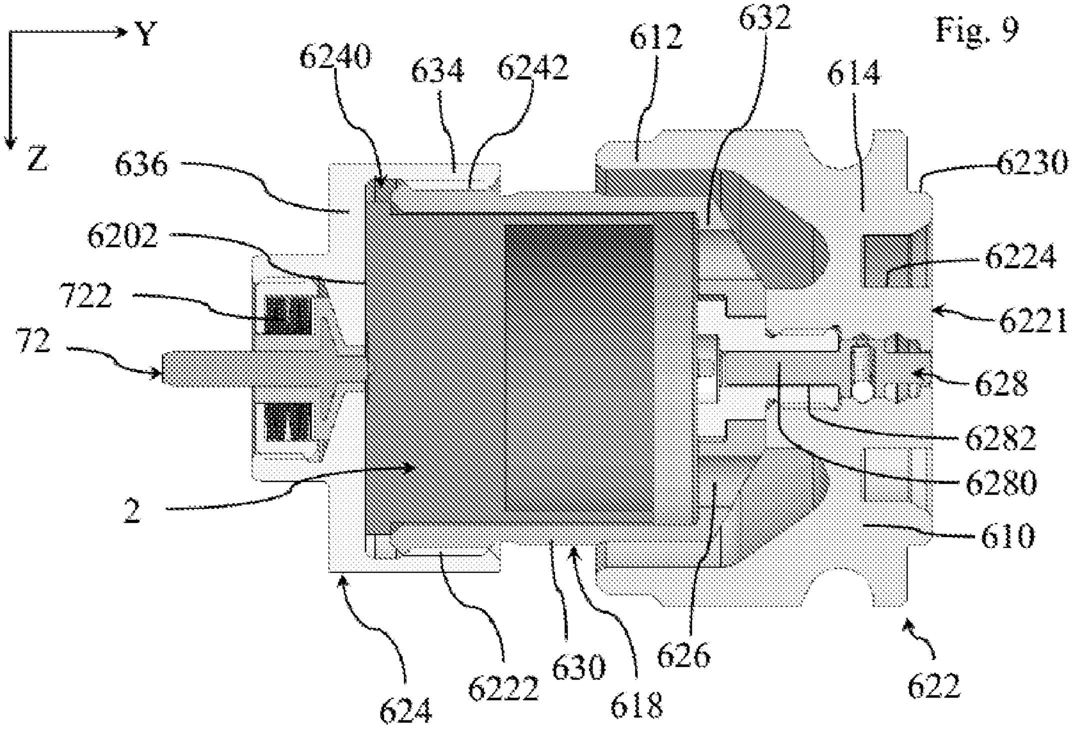
FIG. 9 is a view of the ejector with a cartridge according to the same cross-section.
Figure 10:
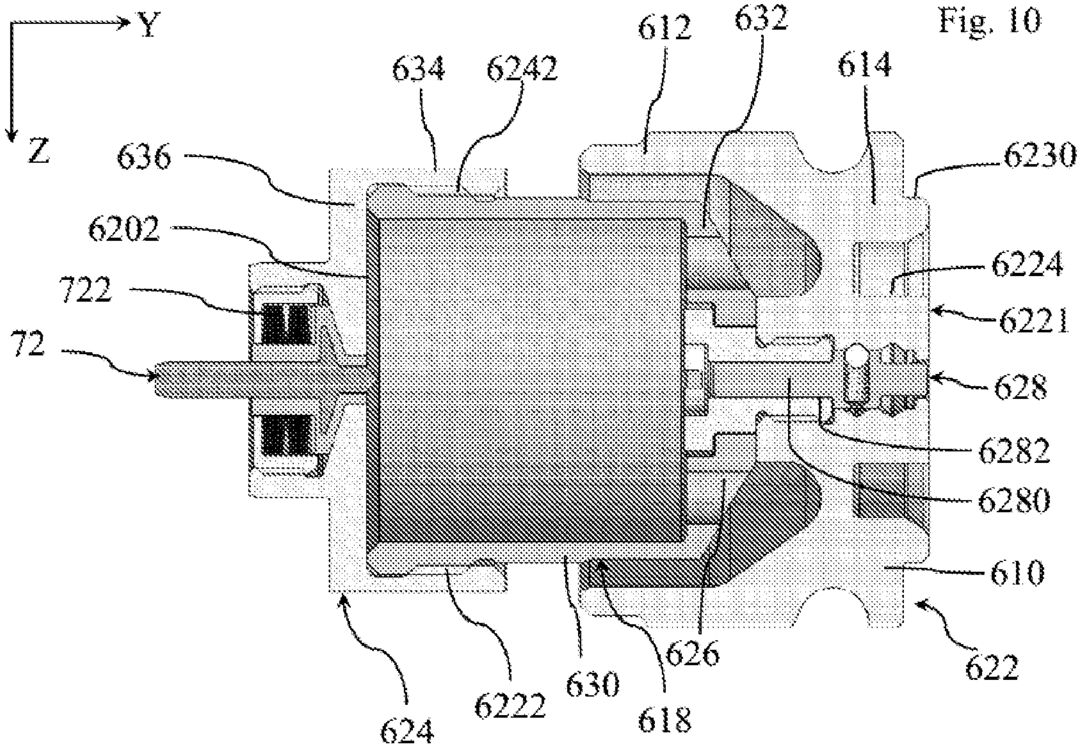
FIG. 10 is a view of the ejector without a cartridge according to the same cross-section.

FIGS. 7 and 8 show the body 60 and the indicator 12 installed in the ejector 1.

The pyrotechnic cartridge 2 has an overall shape of revolution between a first end and a second end. The pyrotechnic cartridge 2 has a rim at the first end. The rim is in general shaped as a circumferential end bead. The pyrotechnic cartridge 2 can be compliant with the standard STANAG_3556_Ed_5.

The body 60 comprises, for each cartridge adapter 62, a recess 620 forming a housing. The recess 620 is machined in the body 6. The recess 620 has an open end 6200 and a bottom 6202. The recess 620 has here a cylindrical overall shape of revolution according to the direction Y. The open end 6200 of the recess 620 has the same diameter as the opening 404 of the spar 400. The open end 6200 of the recess 620 is facing the opening 404 of the spar 400. The open end 6200 and the opening 404 of the spar 400 allow the access to the cartridge adapter 62. The bottom 6202 is intended to receive an end of the cartridge adapter 62, here the first end.

The cartridge adapter 62 comprises a removable bolt 622. The bolt 622 is capable of being mounted at the open end 6200 of the recess 620 to close the recess 620. The bolt 622 has here an overall shape of revolution according to the direction Y.

The bolt 622 comprises a central case 618 and a plug 610 maintained together. The central case 618 and the plug 610 are connected by a pivot link. The central case 618 remains stationary while the plug 610 is screwed with an inner thread of the housing.

The central case 618 comprises a skirt 630 and a head part 632, fastened with respect to one another and impermeable to gases. The first skirt 630 and the head part 632 together define a first volume 6220. The first skirt 630 and the head part 632 are here made in one piece. The head part 632 and the first skirt 630 are made in one piece. The head part 632 forms an annular surface at one end of the first skirt 630 and extending radially towards the inside from the first skirt 630.

The plug 610 comprises an axial skirt 612 and a radial wall 614. The axial skirt 612 comprises a free end and an end linked to the radial wall 614 on the outside of said radial wall 614. The axial skirt 612 and the radial wall 614 are in one piece.

The cartridge adapter comprises a bottom part 624 provided to come into the bottom of the housing. The bottom part 624 has a shape of revolution about an axis parallel to the axis of the housing. The bottom part 624 comprises a radial part 636 and a radial liner 634 in the shape of a skirt. The radial part 636 and the radial liner 634 are in one piece. The radial part 636 forms an annular disc at one end of the radial liner 634 and extending radially towards the inside from the radial liner 634. The radial liner 634 is threaded. The radial liner 634 is capable of being coupled with the skirt 630. The chamber is formed by the bottom part 624 and the central case 618 in the screwed-together state.

The plug 610 is designed to couple with the head part 632, in particular by screwing, the cartridge adapter 62 being capable of being separated from the body 60 while preserving the pyrotechnic cartridge enclosed in the chamber.

The first volume 6220 has an overall cylindrical shape complementary to the pyrotechnic cartridge 2. The first volume 6220 is capable of receiving the body of a pyrotechnic cartridge 2.

The bottom part 624 is mounted in contact with the bottom 6202 of the recess 620, for example by indexed mounting. The bottom part 624 has an overall shape of revolution according to the direction Y. The bottom part 624 forms with the bolt the walls of the chamber 62.

The bottom part 624 has a structure and material impermeable to gases. The radial liner 634 and the radial part 636 together define a second volume 6240. The second volume 6240 is capable of receiving the flange of the pyrotechnic cartridge 2. The second volume 6240 has a cylindrical overall shape complementary to the pyrotechnic cartridge 2. The first volume 6220 and the second volume 6240 communicate by the transverse cross-section of the first volume 6220. The first volume 6220 has a diameter greater than the diameter of the second volume 6240. More precisely, the second volume 6240 opens entirely into the first volume 6220.

The radial part 636 abuts against the bottom of the recess 620. The free end of the radial liner 634 is facing the opening 6200 of the recess 620. The radial part 636 forms a stop against which the cartridge comes when it is inserted into the cartridge adapter 62.

The bolt 622 has near the free end of the first skirt 630 an outer thread 6222. The bottom part 624 has near the free end of the radial liner 634 an inner thread 6242. The thread 6222 and the inner thread 6242 cooperate together via screwing and allow to screw the bolt 622 onto the bottom part 624. When the bolt 622 is screwed to the bottom part 624, the first volume 6220 and the second volume 6240 together form the combustion chamber.

The ignition pin 72 is supported by the bottom part 624, in particular by the radial part 636. The ignition pin 72 is coaxial to the cartridge adapter 62. The ignition pin 72 is mounted translatably with respect to the bottom part 624 according to the axis of the cartridge adapter 62. The ignition pin 72 is mounted on a spring 722, in particular Belleville washers. The spring(s) 722 maintain the ignition pin 72 in a stable position with elastic prestressing against the cartridge. The ignition pin 72 is controlled by an electric trigger 724. The electric trigger 724 is disposed in the body 60 in the bottom of the recess 620. The electric trigger 724 is fastened to the spar 400. The electric trigger 724 is housed in a hole passing through the spar between the bottom of the recess 620 and the first lateral face. The electric trigger 724 is configured to make an electric current circulate in the cartridge during a firing thus triggering the ignition of the cartridge.

The translation travel of the ignition pin 72 is less than the linear travel of screwing according to the axis of said translation: during the beginning of the screwing, the ignition pin 72 is at a distance from the cartridge, or without electric contact, and during the contact between the ignition pin 72 and the cartridge, the adapter is held firmly in translation avoiding a projection of the adapter out of the housing. In the case of accidental ignition, the risks for the operator are thus reduced. The continuation of the screwing after said contact carries out the compression of the spring 722, hence the prestressing.

Alternatively, the cartridge adapter 62 does not have a bottom part 624. The second volume 6240 is formed directly by the body 60 in the recess 620.

The bolt 622 comprises an outer face 6221, visible from the outside of the frame 4 when the bolt 622 is screwed into the housing. The bolt 622 comprises, on the outer face 6221, a maneuvering imprint 6224. The maneuvering imprint 6224 is accessible from the outside of the frame 4. The maneuvering imprint 6224 allows an outside operator to screw the bolt 622 associated with the bottom part 624 into the body 60 using a wrench. The maneuvering imprint 6224 is here shaped into a hexagonal relief.

The recess 620 can comprise an inner thread 6200 and the bolt 622 a thread 6226 provided to engage. The thread 6226 is provided on the outer surface of the plug 610. The inner thread 6200 and the thread 6226 allow to mount the cartridge adapter 62 onto the wall of the recess 620.

Upon insertion of a cartridge into the chamber 6220, the bead of the cartridge abuts against the free end of the first skirt 630 of the central case 618. The bottom part 624 is then screwed onto the central case 618 of the bolt 622 until contact between the bottom part 624 and the cartridge.

In the presence of a cartridge, the bolt 622 can be screwed to the bottom part 624 to a first depth, the cartridge bead acting as a stop. In the absence of a cartridge, the bolt 622 can be screwed to the bottom part 624 to a second depth greater than the first depth, for example until the bolt 622 abuts against the bottom part 624. In other words, the cartridge adapter 62 has in the closed state, that is to say bolt 622 and bottom part 624 screwed, in the presence of a cartridge an axial length greater than the length in the closed state, in the absence of a cartridge.

The bolt 622 is provided with an orifice 626. The orifice 626 fluidly connects the inside of the cartridge adapter 62 to the rest of the pyrotechnic assembly 6. More particularly, the chamber 6220 is in fluid communication by the orifice 626 with an axial outer wall of the cartridge adapter in the housing. The orifice 626 is formed in the head part 632 of the central case 618 of the bolt 622. The orifice 626 can comprise a plurality of holes parallel to the axis of the bolt 622. The orifice 626 opens into an annular duct formed between the head part 632 and the plug 610. Said annular duct opens outside of the cartridge adapter around the first skirt 630. An annular space is provided between the first skirt 630 and the axial skirt 612 of the plug 610. The axial skirt 612 of the plug 610 surrounds the first skirt 630. Facing the orifice 626 an annular groove is provided in the radial part of the plug 610. The annular groove has a bottom toroidal portion radially flaring towards the outside into a tapered portion. The tapered portion joins the bore of the axial skirt 612. Thus, the flow of hot gases coming from the cartridge is deviated towards the outside of the cartridge adapter. A possible abrasion by the hot gases would impact first of all one or more elements of the bolt 622, easily replaceable.

Alternatively, the orifice 626 is formed in the first skirt 630 of the bolt 622.

In the embodiment described here, the cartridge adapter 62 comprises a firing indicator 628 informing on a state of the pyrotechnic cartridge. The state is either fired or non-fired. The firing indicator 628 here is arranged in the bolt 622. More precisely, the firing indicator 628 is mounted in the plug 610.

The firing indicator 628 comprises here a rod 6280. The rod 6280 is housed translatably in a hole 6282 passing through the bolt 622, in particular the radial part of the plug 610. The hole 6282 extends from the first volume 6220 to the outer face 6221 of the bolt 622. Here, the hole 6282 is a substantially cylindrical hole coaxial to the axis of the bolt 622. The hole 6282 passes through the head part 632 of the central case 618 and the plug 610.

The rod 6280 is mobile between a first position (visible in FIG. 8) and a second position. In the first position, the rod 6280 is substantially entirely in the bolt 622. In the second position, the rod 6280 protrudes from the outer face 6221 of the bolt 622.

The rod 6280 has two stable positions, said first and second positions. The two stable positions can be ensured by a ball and spring mechanism, the ball being elastically prestressed and mounted translatably according to an axis perpendicular to the axis of the rod. The ball can be housed in the rod and act on a boss of the plug 610 or vice versa housed in the plug 610 and act on a boss of the rod. The boss is located between the two stable positions.

An inner end of the rod 6280 is in fluid contact with the chamber 6220, while the opposite end of the rod 6280 is visible from the outside of the frame 4. After placement of a cartridge, the rod 6280 is placed by the operator in the first position. A combustion of the pyrotechnic cartridge 2 releases gases. The pressure of the gases acting on the inner end of the rod 6280 pushes the rod 6280 from the first position to the second position. The rod 6280 protrudes out of the bolt 622, thus indicating that a firing has been carried out. The protruding rod 6280 remains stable. The protruding rod 6280 can be pushed back by hand or using a tool, for example a tool for clamping the cartridge adapter, in particular during the replacement of the fired cartridge by a new cartridge.

The bolt 622 is accessible from the outside of the frame 4. The cartridge presence indicator 12 is arranged with the cartridge adapter 62 screwed into the body 60, as visible in FIG. 7.

The cartridge presence indicator 12 comprises, for each bolt 622, a respective paddle 120. Each paddle 120 is mounted pivotably with respect to the direction Y around an axis parallel to the axis of the cartridge adapter 62. Each paddle 120 is mobile between a first, a second and a third position. Each paddle 120 is closer to the axis of the respective cartridge adapter 62 in the first position than in the second position. Each paddle 120 is supported by the body 60. Each paddle 120 is linked axially to the body 60. A translation of the paddle with respect to the body 60 is avoided. Thus, the risk of unscrewing and of loss of the cartridge adapter 62 during a flight is reduced.

The paddle 120 has here a flat overall shape. Here, the right spar 400 comprises a hollow 122. The paddle 120 is mounted in the hollow 122. The paddle 120 is set back from or flush with the second lateral face 48. A gripping lug can be provided protruding to improve the ergonomics.

Each bolt 622, at the first depth, prohibits the second position for the respective paddle 120. Each bolt 622, at the second depth, leaves the respective paddle 120 free to move between the first, the second and the third position.

Each paddle 120 is mobile between the second position and a third position. Each paddle 120 is closer to the axis of the respective cartridge adapter 62 in the second position than in the third position. The paddle 120 in the third position is at a distance from the bolt 622. The bolt 622 can thus be screwed and unscrewed. When the paddle 120 is in the first and in the second position, the cartridge presence indicator 12 prevents the bolt 622 from being unscrewed.

The third position is a non-permanent working position for inserting or removing a cartridge. The second position is located between the first position and the third position. The paddle 120 is elastically prestressed towards the first position, in particular by a return spring. A stable position other than the first and second positions indicates a malfunction, for example insufficient screwing of the bolt, presence of a foreign body, poor engagement of the threads, etc.

The bolt 622 has here, on the outer face 6221, a shoulder 6230. The shoulder 6230 is cylindrical. The shoulder 6230 is formed on an outer edge of the plug 610.

When the bolt 622 is at the first depth and the paddle 120 is free of manipulation, the paddle 120 bears on the respective shoulder 6230. The shoulder 6230 prohibits the first position for the paddle 120.

When the bolt 622 is at the second depth, the shoulder 6230 is pressed into the body 60 according to the direction Y. The shoulder 6230, and more generally the bolt 622, leaves the respective paddle 120 free to move towards the first position.

The cartridge presence indicator 12 comprises for each paddle 120 two marks 124, here designated by "NO" or an absence of a cartridge and "YES" or a presence of a cartridge, respectively indicating the first position and the second position of the paddle 120. The left part of FIG. 7 shows the "YES" position or second position of the paddle and the right part of FIG. 7 shows the "NO" position or first position of the paddle.

The cartridge presence indicator 12 is used to verify the presence of a cartridge in the cartridge adapter 62. The verification, by an operator, comprises the following first group of steps:

1a) raising the cartridge presence indicator 12 to the third position, 1 b) screwing the cartridge adapter 62 into the housing of the body 60 until abutment, 1c) releasing the cartridge presence indicator 12, and 1d) determining whether the cartridge presence indicator 12 has reached the first position.

If, in step 1d, the operator notes that the cartridge presence indicator 12 has reached the first position, then there is no cartridge in the cartridge adapter 62. If, in step 1d, the operator notes that the cartridge presence indicator 12 cannot reach the first position but reaches the second position, then a cartridge is present in the cartridge adapter 62.

The step 1b can be carried out with a torque wrench or a special tool placing the firing indicator 628 in the retracted position.

The verification is simple, and not very dangerous for an operator.

The loading of a cartridge comprises the following second group of steps:

2a) moving the paddle 120 of the cartridge presence indicator 12 into the third position, 2b) removing the cartridge adapter 62 out of the housing of the body 60 by unscrewing, 2c) unscrewing the bottom part 624 thus separating it from the bolt 622, 2d) inserting a cartridge into the chamber 62, 2e) screwing the bottom part 624 with the bolt 622, 2f) raising the paddle 120 then rescrewing the cartridge adapter 62 provided with the cartridge into the housing of the body 60, 2g) releasing the paddle 120 which moves into the second position.

Step 2d is executed while respecting the applicable pyrotechnic safety rules. Step 2e can be carried out using a torque wrench, in order to avoid an overtorque and to guarantee a stress of an ignition pin on the cartridge. Step 2f is executed until abutment.

The second group of steps and the first group of steps are spaced apart by an indeterminate time. The loading can be carried out by a first operator well before a flight, while the verification is carried out just before a flight, in the context of routine last verifications before a mission, in order to guarantee that the cartridge adapters 62 have indeed been loaded with a cartridge.

The verification is further carried out upon mission return, in order to check the presence of a cartridge in the cartridge adapter 62 before opening of the cartridge adapter 62. The verification of the presence of a cartridge comprises the following third group of steps:

3a) if the cartridge presence indicator 12 is in the first position, unscrewing and removing the cartridge adapter 62, and ending the verification, 3b) if the cartridge presence indicator 12 is at a distance from the first position, in particular in the second position, verifying the state of the firing indicator 628, then:

3c) if the firing indicator 628 is in the fired state, then opening the chamber to remove the fired cartridge, otherwise carrying out a procedure of removal of a non-fired cartridge, and ending the verification.

The procedure of removing a non-fired cartridge comprises equipping an operator with pyrotechnic protective gloves or other suitable protective equipment.

Thus, the operator opens the cartridge adapter 62 equipped with pyrotechnic protection when there remains a non-fired cartridge, and thus a non-zero risk of deflagration.

The invention thus allows both to carry out last verifications before a mission, avoiding a mission failure caused by the absence of a cartridge, but also to simplify and secure the installations/deinstallations of a cartridge.

The invention claimed is:

1. An aeronautical conveying and release device actuated by a pyrotechnic cartridge, said device comprising:

a housing provided in a body comprising a recess, the recess having an open end and a bottom, and a cartridge adapter capable of closing the recess and forming a chamber capable of housing the cartridge, wherein:

the device further comprises a cartridge presence indicator mounted, on an outer face of the body, movably between a first position and a second position, the cartridge adapter comprises a bolt capable of being screwed into the housing so that:

in the presence of a pyrotechnic cartridge, the bolt can be screwed to a first depth where the bolt abuts against the pyrotechnic cartridge, the pyrotechnic cartridge being in abutment against the bottom of the recess, and in the absence of a pyrotechnic cartridge, the bolt can be screwed to a second depth greater than the first depth, and the bolt at the first depth prohibits the first position for the cartridge presence indicator, while the bolt at the second depth leaves the cartridge presence indicator free to move.

2. The device according to claim 1, wherein the cartridge adapter (62) forms a stop for a rim of the pyrotechnic cartridge when the bolt is screwed to the first depth in the presence of the pyrotechnic cartridge.

3. The device according to claim 1, wherein the chamber has two opposite ends, one formed by a bottom, the other formed by the bolt, one end of the pyrotechnic cartridge abutting against the bottom when the pyrotechnic cartridge is housed in the chamber, the bolt abutting against the opposite end of the cartridge when the bolt is screwed to the first depth.

4. The device according to claim 1, wherein, in the absence of a cartridge, the bolt can be screwed in abutment against a bottom part of the cartridge adapter.

5. The device according to claim 1, wherein the cartridge presence indicator comprises a paddle rotatably mounted in the body near the open end of the recess, the paddle having a flat overall shape and being mounted in a recess provided in an outer face of the device, set back or flush.

6. The device according to claim 1, wherein the bolt comprises a central case comprising a first skirt and a head part, and a plug, and the cartridge adapter comprises a bottom part comprising a radial part and a second skirt capable of being coupled with the first skirt, to form the chamber, the plug being capable of being coupled with the head part, the cartridge adapter being capable of being separated from the body while preserving the pyrotechnic cartridge.

7. The device according to claim 1, further comprising an ejection portion, configured to push a projectile received by the device when a cartridge housed in the cartridge adapter is activated, and the bottom of the recess or of the cartridge adapter comprises at least one orifice connecting the cartridge adapter to the ejection portion.

8. The device according to claim 1, further comprising a firing indicator informing on a fired state or a non-fired state of the device.

9. A method for verifying a an aeronautical conveying and release device actuated by a pyrotechnic cartridge that comprises:

a housing provided in a body having a recess, the recess having an open end and a bottom, a cartridge adapter capable of closing the recess and forming a chamber capable of housing the cartridge, and a cartridge presence indicator mounted, on an outer face of the body, movably between a first position and a second position, the cartridge adapter having a bolt capable of being screwed into the housing so that:

in the presence of a pyrotechnic cartridge, the bolt can be screwed to a first depth where the bolt abuts against the pyrotechnic cartridge, the pyrotechnic cartridge being in abutment against the bottom of the recess, and in the absence of a pyrotechnic cartridge, the bolt can be screwed to a second depth greater than the first depth, and the bolt at the first depth prohibits the first position for the cartridge presence indicator, while the bolt at the second depth leaves the cartridge presence indicator free to move, the method comprising at least the following group of steps:

1a) raising the cartridge presence indicator, 1b) screwing the cartridge adapter into the housing until abutment, 1c) releasing the cartridge presence indicator, and 1d) determining whether the cartridge presence indicator reaches the first position.

10. The method according to claim 9, further comprising the following group of steps:

2a) moving the cartridge presence indicator into a third position, 2b) removing the cartridge adapter, 2c) opening the cartridge adapter, 2d) inserting a cartridge into the chamber, then closing the cartridge adapter, 2e) moving the cartridge presence indicator, then remounting the cartridge adapter provided with the cartridge in the housing, 2f) releasing the cartridge presence indicator.

11. The method according to claim 9, further comprising:

3a) if the cartridge presence indicator is in the first position, removing the cartridge adapter, and ending the verification, 3b) if the cartridge presence indicator is at a distance from the first position, in particular in the second position, verifying the state of a firing indicator, then:

3c) if the firing indicator is in the fired state, then removing the cartridge adapter, opening the chamber to remove the cartridge, otherwise carrying out a procedure of removal of a non-fired cartridge, and ending the verification.

* * * * *